(12) United States Patent
Fang

(10) Patent No.: US 7,788,698 B2
(45) Date of Patent: Aug. 31, 2010

(54) PRE-NEGOTIATION AND PRE-CACHING MEDIA POLICY

(75) Inventor: Nicholas Fang, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1400 days.

(21) Appl. No.: 11/216,898

(22) Filed: Aug. 31, 2005

(65) Prior Publication Data

US 2007/0067821 A1 Mar. 22, 2007

(51) Int. Cl.
*H04L 9/00* (2006.01)
*H04L 9/32* (2006.01)

(52) U.S. Cl. ............................... 726/1; 726/3; 713/189

(58) Field of Classification Search ................. 726/1–2, 726/11–15; 713/150, 152–154, 160, 162, 713/189; 380/212; 725/25, 30–31
See application file for complete search history.

(56) References Cited

U.S. PATENT DOCUMENTS

| | | | |
|---|---|---|---|
| 5,874,986 A | 2/1999 | Gibbon et al. | |
| 6,092,154 A | 7/2000 | Curtis et al. | |
| 6,463,508 B1 | 10/2002 | Wolf et al. | |
| 6,490,587 B2 | 12/2002 | Easty et al. | |
| 6,625,150 B1* | 9/2003 | Yu | 370/389 |
| 6,917,960 B1 | 7/2005 | Decasper et al. | |
| 2002/0141585 A1* | 10/2002 | Carr | 380/255 |
| 2003/0016803 A1* | 1/2003 | Schmid et al. | 379/201.01 |
| 2003/0018917 A1 | 1/2003 | Brown, Sr. | |
| 2004/0139088 A1 | 7/2004 | Mandato et al. | |
| 2005/0120215 A1 | 6/2005 | Lehew | |

FOREIGN PATENT DOCUMENTS

| WO | WO03063439 | 7/2003 |
|---|---|---|
| WO | WO2004039031 | 5/2004 |

OTHER PUBLICATIONS

Wee et al., "Research and Design of A Mobile Streaming Media Content Delivery Network", Apr. 14, 2003, http://hpl.hp.com/techreports/2003/HPL-2003-77.pdf.
Khan et al, "Partial Prefetch for Faster Surfing in Composite Hypermedia", USITS '01, http://usenix.org/events/usits01/full_papers/khan/khan_html/.

* cited by examiner

*Primary Examiner*—Hosuk Song
(74) *Attorney, Agent, or Firm*—Lee & Hayes, PLLC

(57) ABSTRACT

A device receives streaming media comprised of discrete content packets. The device separately receives policies that are associated with specific content packets. The policies are processed prior to receiving the content packets, such that the device is made ready to consume the content packets when they are received.

17 Claims, 4 Drawing Sheets

PRE-NEGOTIATION AND PRE-CACHING MEDIA POLICY

BACKGROUND

In the wake of the public's wide-spread acceptance and adoption of computers, many households and businesses are implementing local networks for the purpose of connecting various electrical devices. As an example, users can employ a server or host device (such as a media compatible personal computer (PC)) as an entertainment server to stream media content over a network to client devices such as a desktop PCs, notebooks, portable computers, cellular telephones, other wireless communications devices, personal digital assistants (PDA), gaming consoles, IP set-top boxes, hand-held PCs, and so on. One of the benefits of streaming is that the client device(s) may render (e.g., play or display) the streaming content on devices such as stereos and video monitors situated throughout a house as the content is simultaneously received from the entertainment server, rather than waiting for all of the content or the entire "file" to be delivered.

Streamed media content can include many different types of audio and video programming with one example being television audio and video content (or simply "TV content"). TV content may "broadcast" or originate from various sources or channels, such as channels typically broadcasting over common radio frequencies (i.e., local television channels), premium channels, pay per view channels, etc. During a particular viewing session, a user may "surf" through various channels. For example, the user may start off watching a local news channel, switch to a premium channel broadcasting a sporting event, then switch to a pay per view channel broadcasting a live music concert.

TV content may be associated with a particular policy or policies. Policy includes attributes associated with the TV content and media content in general. Typical policy includes rights to copy or record the TV content, how the TV content may be rendered or displayed, and the type of equipment that may display the TV content (i.e., analog receiver or digital receiver).

Although different channels or sources may implement different policy or policies, policy associated with TV content is channel or source independent. As an example, although pay per view channels may associate read only policy (i.e., no copy) with TV content, a local broadcast channel may also associate read only policy to TV that is to be protected from copying. In certain situations, the same channel or source may broadcast different TV content having different policies. In other words, a live concert may have policy to prevent copying of the actual concert; however, commercial intermission TV content played before, during, or after the concert, may have policy that allows copying.

When a viewing session is undertaken, the user expects to have a seamless viewing experience with no glitches or interruptions as the user "surfs" or goes between channels (i.e., sources). The implementation or use of policy as to TV content (i.e., media content) interrupts the seamless viewing experience. As TV content is received along with its policy or policies, a receiver must process the policy or policies prior to processing the TV content, resulting in glitches, pauses, or noticeable interruptions seen by the user.

Therefore, there exists a need to process policies and media content without noticeable interruptions as different media content having different policy or policies is received and processed.

SUMMARY

Streaming media comprised of discrete content packets are received for consumption. Policies associated with particular content packets are received prior to their respective content packets. The policies are parsed prior to the respective content packets being received in order to properly consume the content packets. The policies are implemented when the respective content packets are played.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The following disclosure describes techniques in which policy or policies are cached prior to processing media content.

Figure 1:
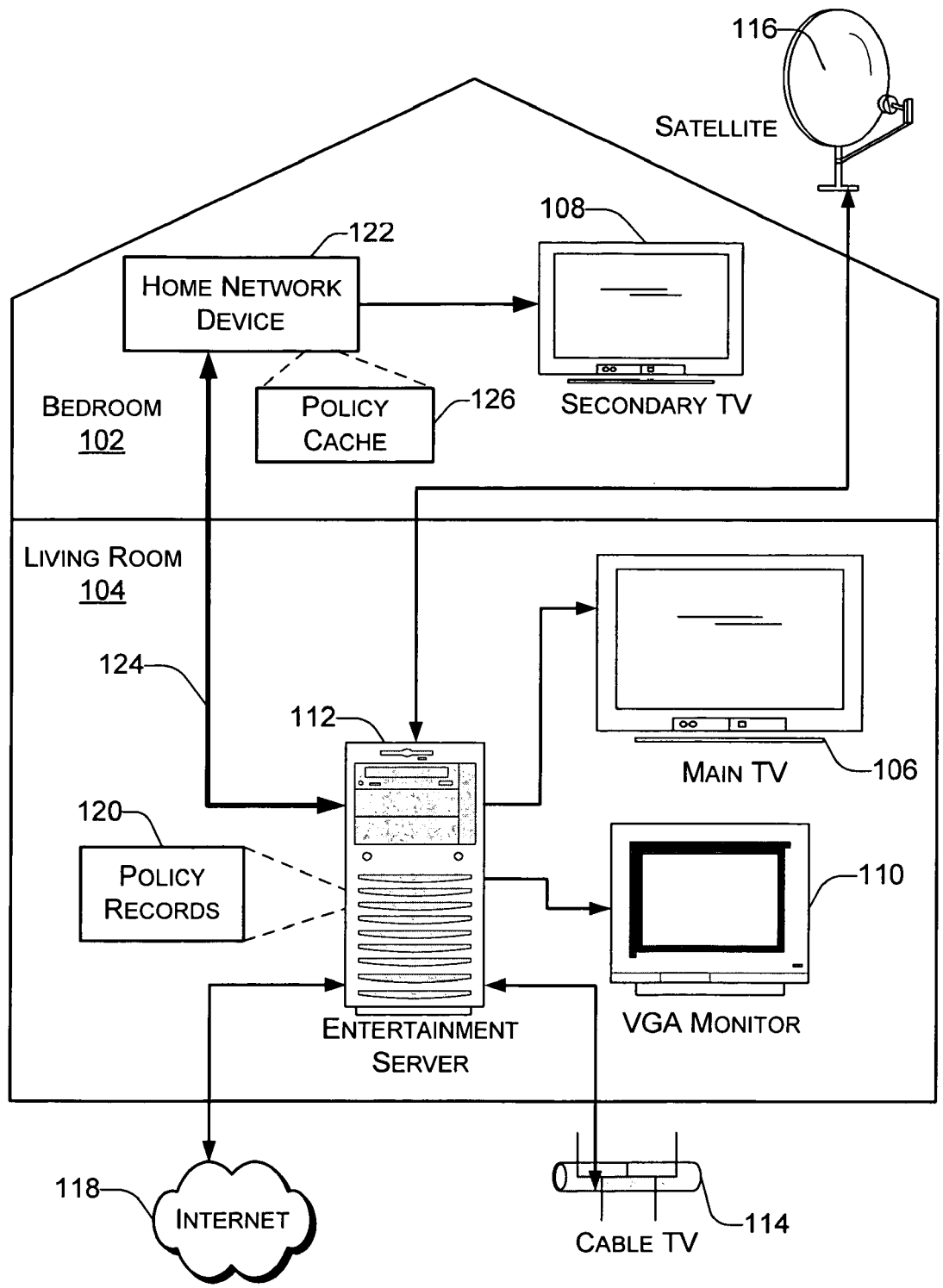
FIG. 1 is an illustration of an exemplary home environment that includes an entertainment server, a home network device, and a home television that provides for pre-caching of policies.

FIG. 1 shows an exemplary home environment 100 including a bedroom 102 and a living room 104. Situated throughout the home environment 100 are multiple monitors, such as a main TV 106, a secondary TV 108, and a VGA monitor 110. Media content including television or TV content, may be supplied to each of the monitors 106, 108, 110 over a home network from an entertainment server 112 situated in the living room 104. In one implementation, the entertainment server 112 is a conventional personal computer (PC) configured to run a multimedia software package like the Windows® XP Media Center™ edition operating system marketed by the Microsoft Corporation. In such a configuration, the entertainment server 112 is able to integrate full computing functionality with a complete home entertainment system into a single PC. For instance, a user can watch TV in one graphical window of one of the monitors 106, 108, 110 while sending email or working on a spreadsheet in another graphical window on the same monitor. In addition, the entertainment system may also include other features, such as: a personal video recorder (PVR) to capture live TV shows for future viewing or to record the future broadcast of a single program or series; DVD playback; an integrated view of the user's recorded content, such as TV shows, songs, pictures, and home videos; and a 14-day EPG (Electronic Program Guide)

In addition to being a conventional PC, the entertainment server 112 could also comprise a variety of other devices capable of rendering a media component including, for example, a notebook or portable computer, a tablet PC, a workstation, a mainframe computer, a server, an Internet appliance, combinations thereof, and so on. It will also be understood that the entertainment server 112 could be a set-top box capable of delivering media content to a computer where it may be streamed, or the set top box itself could stream the media content.

With the entertainment server 112, a user can watch and control a live stream of media content (e.g., television content) received, for example, via cable 114, satellite 116, an antenna (not shown for the sake of graphic clarity), and/or a network such as the Internet 118. This capability is enabled by one or more tuners residing in the entertainment server 112. It will also be understood, however, that the one or more tuners may be located remote from the entertainment server 112 as well. In both cases, the user may choose a tuner to fit any particular preferences. For example, a user wishing to watch both standard definition (SD) and high definition (HD) content should employ a tuner configured for both types of contents. Alternately, the user could employ an SD tuner for SD content, and an HD tuner for HD content.

The entertainment server 112 may also enable multi-channel output for speakers (not shown for the sake of graphic clarity). This may be accomplished through the use of digital interconnect outputs, such as Sony-Philips Digital Interface Format (SPDIF) or Toslink enabling the delivery of Dolby Digital, Digital theater Sound (DTS), or Pulse Code Modulation (PCM) surround decoding.

Additionally, the entertainment server 112 includes a list of policy records 120 that apply to media content or content packets received from cable 114, satellite 116, the antenna, and/or the network such as the Internet 118. The policies of the policy records 120, particularly define attributes of the content packet. Typically, policies address how a content packet is consumed or processed on a device. Examples of policies include the right to copy, the number of times the media content may be copied, the ability to copy to particular devices, and the ability to render to particular devices. TV content is used as an example; however, it is to be appreciated that the methods discussed may also apply to other media content that includes policies. One example of other media content includes analog and digital radio media content or audio media content. The policies of policy records 120, and methods involving the use of policies, will be described below.

Since the entertainment server 112 may be a full function computer running an operating system, the user may also have the option to run standard computer programs (word processing, spreadsheets, etc.), send and receive emails, browse the Internet, or perform other common functions.

The home environment 100 also includes a receiver or home network device 122 placed in communication with the entertainment server 112 through a local network 124. In a particular embodiment, the home network device 122 may be a Media Center Extender device marketed by the Microsoft Corporation. The home network device 122 may also be implemented as any of a variety of conventional computing devices, including, for example, a desktop PC, a notebook or portable computer, a workstation, a mainframe computer, an Internet appliance, a gaming console, a handheld PC, a cellular telephone or other wireless communications device, a personal digital assistant (PDA), a set-top box, a television, combinations thereof, and so on. Furthermore, home network device 122 may include a tuner as described above.

In addition, home network device 122 includes a policy cache 126. Policy cache 126 stores policies received from entertainment server 112, and/or pre-existing policies not necessarily received from entertainment server 112. The policies may be sent separate or "out of band" from the media content or TV content sent by entertainment server 112. Through the use of policy cache 126, TV content is processed according to these policies as the TV content is received by home network device 122.

The network 124 may comprise a wire, and/or wireless network, or any other electronic coupling means, including the Internet. It will be understood that the network 124 may enable communication between the home network device 122 and the entertainment server 112 through packet-based communication protocols, such as transmission control protocol (TCP), Internet protocol (IP), real time transport protocol (RTP), and real time transport control protocol (RTCP). The home network device 122 may also be coupled to the secondary TV 108 through wireless means or conventional cables.

The home network device 122 is configured to receive streamed media content, and particularly TV content, from the entertainment server 112. The media content may be delivered in a variety of ways using different protocols, including, for example, standard remote desktop protocol (RDP), graphics device interface (GDI), or hyper text markup language (HTML). The streamed media content may comprise video IP, SD, and HD content, including video, audio and image files, decoded on the home network device 122 and then "mixed" with the user experience stream for output on the secondary TV 108.

In FIG. 1, a single home network device 122 is shown; however, it is appreciated that a plurality of home network devices 122 and corresponding displays may be dispersed throughout the home environment 100, with each home network device 122 being communicatively coupled to the entertainment server 112. It will also be understood that in addition to the home network device 122 and the monitors 106, 108, 110, the entertainment server 112 may be communicatively coupled to other output peripheral devices, including components such as speakers and a printer (not shown for the sake of graphic clarity).

Figure 2:
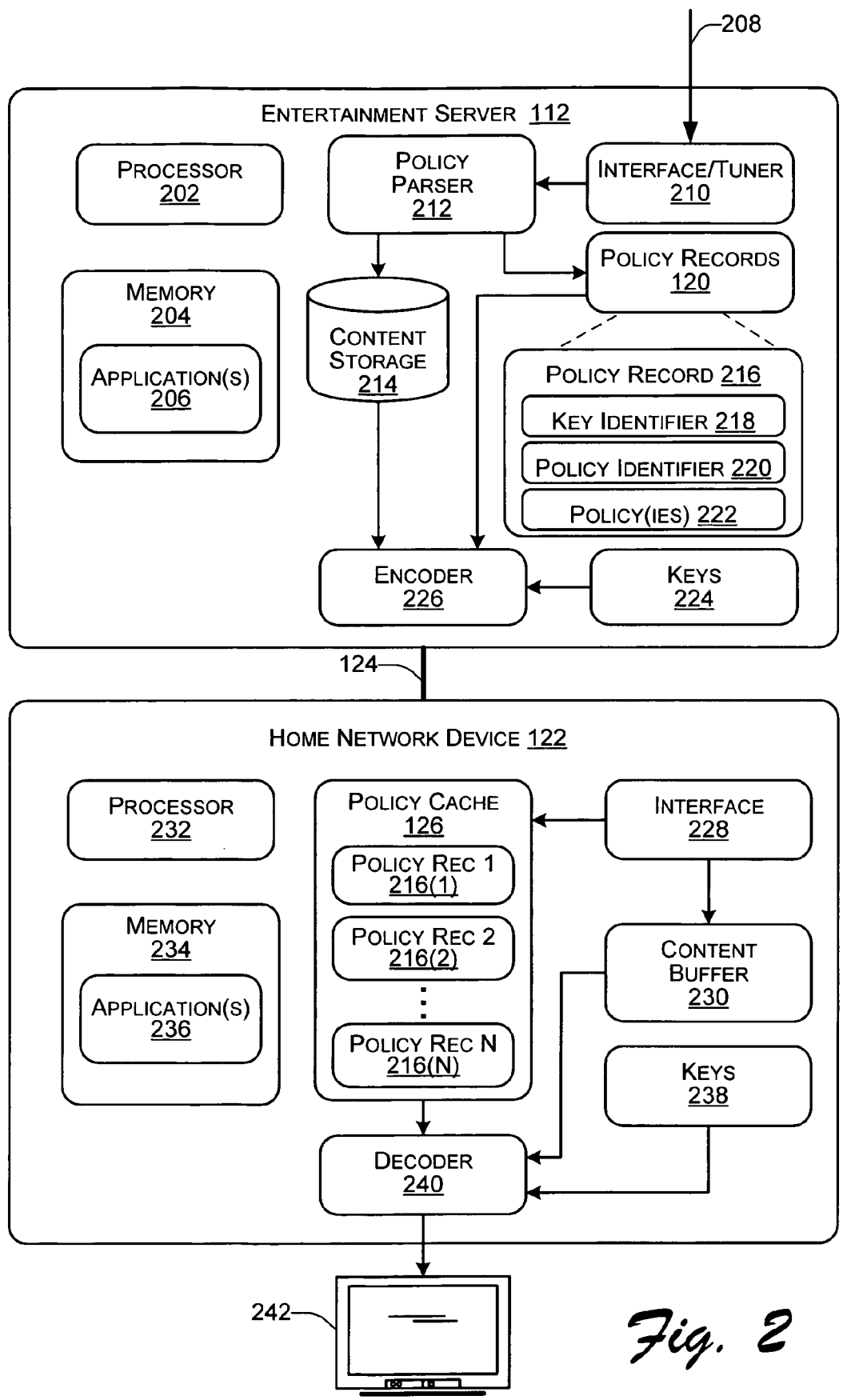
FIG. 2 is a block diagram illustrating an entertainment server having policies, and a home network device having a policy cache to receive the policy records.

FIG. 2 shows an exemplary entertainment server 112 and home network device 122 as part of a system 200. The system 200 may be included in home environment 100 of FIG. 1. Media content, and particularly TV content, is sent from entertainment server 112 to home network device 122 as streaming media comprised of discrete content packets. Policy is sent separate from or "out of band" of the streaming media or media content through network 124. TV content is described as an example; however, it is contemplated that other media content such as audio (i.e., "radio") content is also applicable.

Exemplary entertainment server 112 includes a central processing unit or processor 202, and a memory 204. Memory 204 includes an application or applications 206 that may create or process TV content 208 streamed to entertainment server 112. An interface or tuner 210 may be configured to receive the TV content 208 from one or more sources such as cable 114, satellite 116 and a network such as the Internet 118 as described above in FIG. 1.

The TV content 208 may be received as an analog (i.e., radio frequency) signal or a digital signal (i.e., CATV). The received TV content 208 may include discrete content packets, where each content packet includes actual TV content (i.e., audio and video data) and a policy or policies associated with the actual TV content. If TV content 208 is received as an analog signal, discrete content packets may be created from the analog signal. Furthermore, when digital rights management or DRM is employed to protect the actual TV content, licenses may also be associated with the actual TV content. A license identifies keys used to decrypt TV content (i.e., content packets) that are encrypted as part of DRM. In particular, the keys are used to allow consumption or use of the actual TV content. In certain implementations the content packets of received TV content may be encrypted or compressed. Encrypted content packets are typically decrypted with keys transmitted to or resident at the playback device or home network device 122.

The streaming media may be sent to a policy parser 212 that separates policy or policies from the TV content. In this implementation, the separated or parsed policies are sent and stored in list of policy records 120, where each policy record is identified or associated with their respective content packet. In certain implementations, a unique identifier is assigned to each of the policy records in policy records 120. The actual TV content or content packets may be stored in a content storage 214. In certain cases, policy or policies of the content packets are not parsed or separated. Policy or policies of the content packets are identified, and an association is made with pre-existing policy or policies residing in the list of policy records 120. Policy records 120 can include multiple policy records, as represented by policy record 216. Each policy record 216 can further include a key (or keys) identifier 218, a policy identifier 220, and policy (policies) 222.

In particular implementations and specifically situations implementing DRM, a set of keys 224 may be included in or identified by entertainment server 112. The keys 224 may be identified by a unique key identifier, such as key identifier 218 described above. Furthermore, keys 224 may be associated with specific policies to define a license associated with specific content packets. A unique identifier may be assigned to specific licenses. Particular keys are used to decrypt particular content packets.

An encoder 226 may process content packets or actual TV content, along with their respective policy or policies, prior to sending the content packets (i.e., TV content), policies, and in certain situations, keys, to home network device 122. The encoder 226 particularly creates relationships as to the content packets, their policy or policies, and licenses (i.e., keys associated in the licenses). In certain implementations, encoder 226 also performs compression and/or encryption of content packets, policies, and keys.

Policies (i.e., policy records) are sent to home network device 122 "out of band" or separate from the content packets. In order to minimize glitches or interruptions in viewing, one or more policies associated with a particular content packet are parsed and sent ahead of the content packet to home network 122. The policies are implemented by home network device 122 when the particular content packet is played. The sending of policies may be performed during non-critical times when streaming (i.e., sending) of media content (i.e., content packets) is not interrupted.

Policies (i.e., policy records) and content packets are received by an interface 228 that differentiates between policies and content packets. Policy records 216 are sent to the policy cache 126 and content packets are sent to a content buffer 230. Policy cache 126 stores policy records 216(1) . . . 216(N), where each policy record 216 includes one or more policies associated with a particular content packet. Policy identifier 220 may be provided with each policy record 216 providing a means to identify a particular policy. Key identifier 218 may be provided with each policy record 216 to associate it with a particular key or keys.

Prior to sending any content packet, a separate message or indication may be made containing a policy identifier 220 that indicates that the following content packets should be treated with the specified policy associated with the policy identifier 220. The indication allows the home network device 112 to call up or fetch the appropriate policy record 216 to support the particular content packet and if applicable, any necessary keys to decrypt the content packet.

Exemplary home network device 122 includes a central processing unit or processor 232, and a memory 234. Processor 232 controls interface 228 and other components of home network 122. Memory 234 includes an application or applications 236 that consumes or uses media content (i.e., content packets) received from sources such as entertainment server 112. Memory 234 may also store a set of keys such as keys 238; however, in this example, set of keys 238 is illustrated separate from memory 234. The set of keys 238 may be sent separate from the content packets and the policies, and are used to decrypt content packets. Each key in the set of keys 238 may be identified by unique key identifier such as key identifier 218.

In this implementation, a decoder 240 receives content packets from content buffer 230, looks to policy cache 126 as to a particular policy record 216 of the list of policy records 216(1) to 216(N), and implements the particular policy record 216 associated with a particular content packet. In particular, policy or policies are implemented as specified by the policy identifier 220 associated with the particular content packet. As described above, the particular policy record 216 may be directed to copying, consumption or use on a particular device, format, etc. If no conflicts exist, as different policy records 216 are implemented for different content packets, the viewing experience should not be interrupted. Otherwise, if a conflict does exist, an interruption may be experienced. For example, if a particular policy conflicts with how newly received media content is consumed at the home network device, a change or changes may be in order before viewing the newly received content packet.

In implementations using DRM, the decoder 240 may look up appropriate keys in 238 in order to decrypt an encrypted content packet. The policies and keys that are associated with the encrypted content packet may be part of a license associated with the encrypted content packet.

In certain cases, when a policy record 216 is called or used by decoder 240, the policy record 216 is removed from policy cache 126 and cannot be used again. In other cases, policy records 216 may remain in policy cache 126 to be used with subsequently received content packets. Policies records 216 may be removed in order to protect from invalid consumption or use of content packets. In other words, a policy record 216 is given a unique association with a series of content packets so that only the particular policy record 216 may be used with those particular content packets. The particular policy record 216 is removed once the particular content packets are consumed.

The decoder 240 may further perform decompressing of content packets. Based on their respective policy or policies (i.e., policy record 216), and decrypted using particular keys if applicable, content packets are consumed by decoder 240 and displayed as audio video data (i.e., streaming media) through monitor or display 242.

Figure 3:
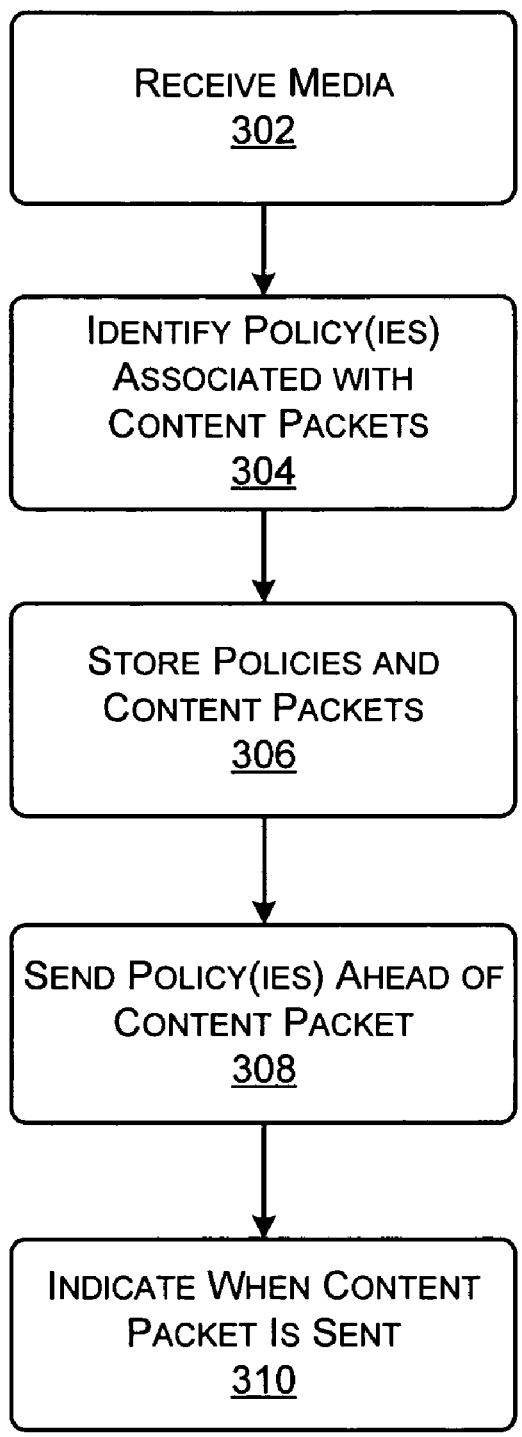
FIG. 3 is a flow diagram illustrating a process that separately provides media content and the policy or policies associated with the media content.

FIG. 3 shows a process 300 that separately provides streaming media and the policy or policies associated with the streaming media. The process 300 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. Although described as a flowchart, it is contemplated that certain processes may take place concurrently or in a different order. The process may be implemented, for example, by the entertainment server as discussed in FIG. 1 and FIG. 2, although the process 300 may be implemented by other architectures.

At block 302, streaming media, and as an example, TV content, is received from one or more sources. An interface or tuner such as interface/tuner 210 may receive such TV content in the form of analog (i.e., RF) signals and/or digital signals. The received TV content can be partitioned into discrete content packets where each content packet may be associated with a particular policy or policies.

At block 304, policy or policies associated with each of the received content packets are identified. The identification can include parsing or separating policy or policies form the actual media or TV content. The parsing may be performed by policy parser 212 described in FIG. 2. In certain situations, the separated policy or policy record is placed in a list of policies or policy records. In other situations, pre-existing policies (i.e., policy records) may be available in the list of policies, and an association is made with the content packets and pre-existing policy or policies. The association may include providing a unique identifier (i.e., policy identifier 220) to the policy or policies (i.e., policy record) and associating that identifier with the policy. In certain cases implementing DRM, a license and specifically keys used to decrypt encrypted content is also identified. A unique identifier (i.e., key identifier 218) may also be provided as to a key or keys associated with the license.

At block 306, policy or policies (i.e., policy records) are stored separate from their associated content packets. In certain implementations, only the content packets are stored or placed in a buffer. Policies may be stored in a policy records store such as policy records 120 and content packets may be stored in content storage 214 described in FIG. 2.

At block 308, the policies or policy records are sent ahead of their associated content packets. This may be performed by sending the policies as soon as they are parsed from the content packets or as the policies are identified or associated with the content packets as performed in block 304. In certain cases, keys used in DRM protection may be associated with policies to create particular licenses applied to the content packets. Encoder 226 described in FIG. 2 may perform the sending of the policy or policies (i.e., policy records) and/or licenses. The sending of policies may be performed during periods of decreased transmission. For example, in order not to disrupt the sending or streaming of media content or content packets, the policies are sent whenever media content or content packets are not sent.

At block 310, as content packets are sent, a message or an identifier is sent to apply the particular policy or policies (i.e., policy record) associated with particular content packets. Furthermore, the same message or identifier or a different message or identifier may be sent that indicates implementing a particular license or keys to decrypt an encrypted content packet. The messages or identifiers, and content packets may be sent by encoder 226 of FIG. 2.

Figure 4:
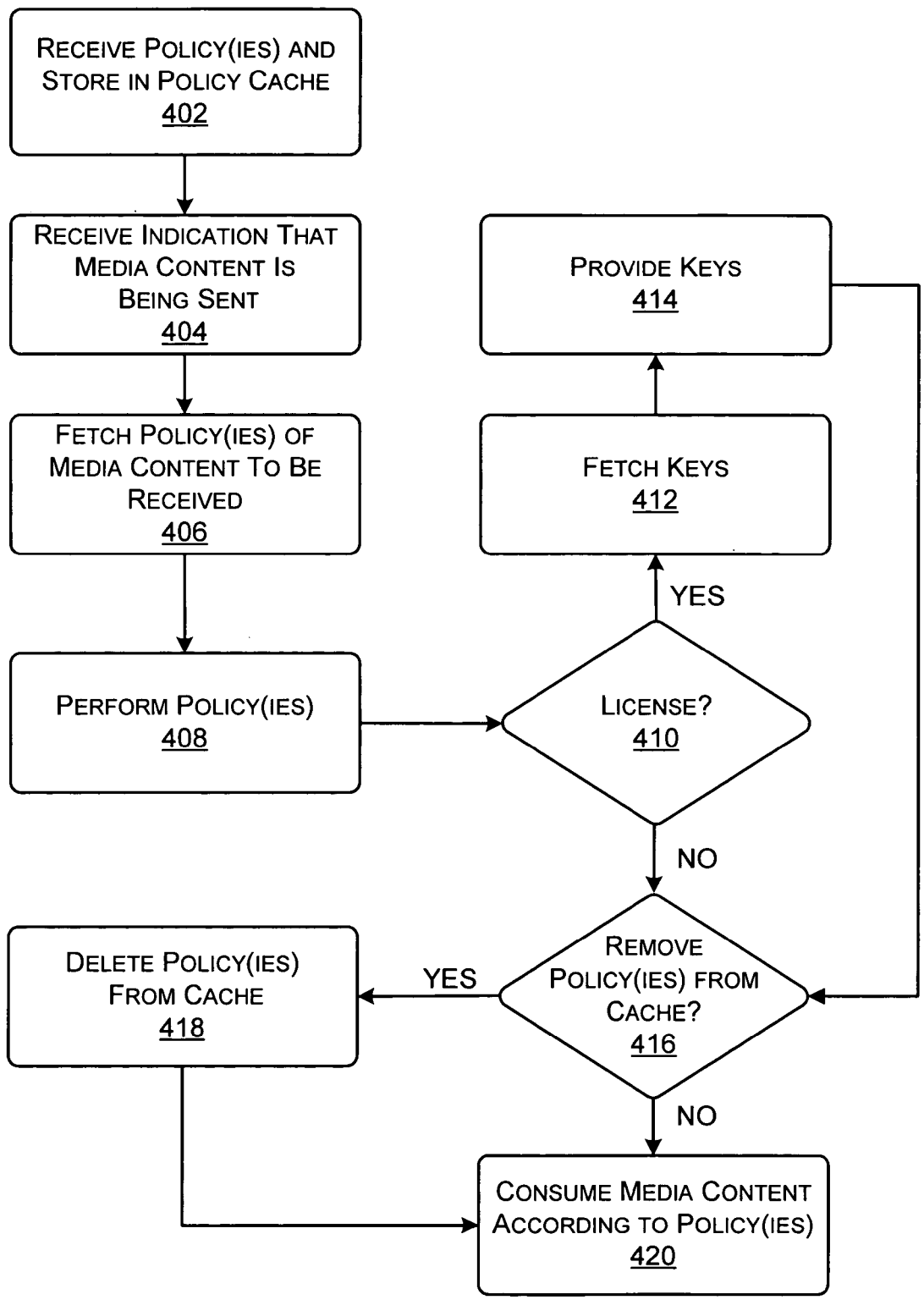
FIG. 4 is a flow diagram illustrating a process that receives and processes policies and media content separate from one another.

FIG. 4 shows a process 400 that receives and processes policies and media content separate from one another. The process 400 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. Although described as a flowchart, it is contemplated that certain processes may take place concurrently or in a different order. The process may be implemented, for example, by the home network device 122 as discussed in FIG. 2, although the process may be implemented by other architectures.

At block 402, policies or policy records associated with media content and particularly content packets, are received and stored in memory or a policy cache, such as policy cache 126. The policies or policy records are received separate from and prior to the media content or content packets associated with the policies.

At block 404, a message or an indication is received that a particular media content or content packet is being sent from a remote source (such as the entertainment server 112) and is about to be received. The indication is used to properly prepare to receive and process the content packet based the particular policy or policies (i.e., policy record) associated with the content packet, and in certain DRM implementations, fetch the appropriate keys to decrypt an encrypted content packet.

At block 406, the particular policy or policies (i.e., policy record) associated with the content packet to be received, is fetched from storage, memory, or policy cache (e.g., policy cache 126). The fetched policy or policies (i.e., policy record) may be policies that were received, or in certain implementations, the fetched policy or policies (i.e., policy record) may be pre-existing policies resident in memory or policy cache.

At block 408, the fetched policy or policies (i.e., policy record) are implemented or performed prior to receiving the associated content packet. An example of a policy is the right to copy the content packet. If the content packet is write protected, appropriate settings will be made in order to prevent the content packet from being copied. In certain cases, a previously received content packet may presently be consumed using specific policy or policies. In other words, policies associated with the previously received content packet are implemented prior to implementation of the subsequent policy or policies.

In certain implementations using DRM, a license, and specifically keys associated with the license, may be needed to decrypt an encrypted content packet. If a license (i.e., keys) is needed (i.e., following the YES branch of block 410), at block 412 the appropriate keys are fetched from memory or dedicated storage. At block 414, with the fetched keys are provided, allowing the encrypted content packet to be decrypted and consumed. If there is no need for license or keys (i.e., following the NO branch of block 410), block 416 is performed.

Regardless of whether or not a license is to be created, it may be desirable to remove the policies (i.e., policy record) from memory or cache, once a policy or policies is performed, and after the license is created. If a policy (i.e., policy record) is to be removed (i.e., following the YES branch of block 416), at block 418 the policy or policies (i.e., policy record) are deleted from memory or cache, so that the particular policy or policies (i.e., policy record) cannot be used with other media content (i.e., content packets). In certain applications policies are continued to be stored or kept in memory or cache (i.e., following the NO branch of block 416).

At block 420, when policies (i.e., policy record) are performed and if applicable when licenses (i.e., keys) are fetched, content packets are used or consumed per the respective policy or policies and if applicable decrypted using particular keys.

CONCLUSION

The above-described methods and devices describe a providing policies separate and prior to media content in order to avoid interruptions in the use of the media content when implementing new or different policies. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented on a computing device by a processor configured to execute instructions that, when executed by the processor, direct the computing device to perform acts comprising:
   receiving and storing in storage one or more policies associated with one or more content packets of a streamed media, the receiving the one or more policies being performed during times when content packets are not streamed;
   receiving an indication that the one or more content packets are to be received;
   implementing the one or more policies prior to receiving the one or more content packets; and
   removing the one or more policies from the storage after implementing the one or more policies.

2. The method of claim 1 wherein the receiving one or more policies includes an identifier that associates the one or more content packets with the one or more policies.

3. The method of claim 2 further comprising fetching the one or more policies from the storage prior to the implementing.

4. The method of claim 2, wherein the one or more policies associated with previous content packets are implemented to the one or more content packets.

5. The method of claim 1 wherein the receiving an indication includes at least one of an identifier or a message that associates the one or more policies and the one or more content packets.

6. The method of claim 1 wherein the implementing is performed subsequent to consumption of a previously received one or more content packets.

7. The method of claim 1 further comprising fetching keys to decrypt the one or more content packets if a content packet from among the one or more content packets is encrypted, wherein receiving the indication includes identifying the keys to be fetched.

8. The method of claim 1 wherein the computing device is a home network device.

9. A home network device comprising:
   a processor;
   an interface, controlled by the processor, to receive content packets and policies associated with the content packets;
   a buffer to store the received content packets;
   a cache to store the received policies;
   a decoder to process and implement policies to the content packets, wherein the policies include one or more policies that are removed from the cache after implementing; and
   a set of keys, particular keys being looked up by the decoder in order to decrypt content packets that are encrypted.

10. The device of claim 9, wherein the interface receives the content packets out of band from the associated policies.

11. The device of claim 9, wherein the cache stores the policies as policy records that include one or more policies that are associated with particular content packets.

12. The device of claim 9, wherein the policies from previous content packets are implemented to the content packets.

13. The device of claim 9, wherein the decoder processes policies associated with a content packet, after a previously received content packet is consumed.

14. The device of claim 9, wherein the decoder decompresses content packets that are compressed.

15. A method comprising:
   receiving streaming media that includes content packets having particular policies;
   associating the content packets with their particular policies;
   sending the policies to a device that will consume the content packets, the policies being sent prior to sending the content packets so that respective policies are processed before the device consumes the content packets;
   subsequently sending the content packets to the device, wherein the respective policies are removed after the content packets are consumed; and
   sending a message prior to sending a content packet, the message indicating policies to be implemented as to the content packet that is sent.

16. The method of claim 15 wherein the receiving streaming media content includes television content.

17. The method of claim 15 further comprising identifying decryption keys associated with content packets if the content packets are encrypted.

* * * * *